(12) United States Patent
Godbillon

(10) Patent No.: US 9,256,019 B2
(45) Date of Patent: Feb. 9, 2016

(54) LIGHT GUIDE WITH DECOUPLING PORTION AND SHIELD COLLECTING THE DECOUPLED RAYS

(75) Inventor: Vincent Godbillon, Paris (FR)

(73) Assignee: Valeo Vision, Bobigny (FR)

( * ) Notice: Subject to any disclaimer, the term of this patent is extended or adjusted under 35 U.S.C. 154(b) by 418 days.

(21) Appl. No.: 13/535,597

(22) Filed: Jun. 28, 2012

(65) Prior Publication Data

US 2013/0003398 A1  Jan. 3, 2013

(30) Foreign Application Priority Data

Jun. 29, 2011  (FR) ...................................... 11 55785

(51) Int. Cl.
*F21S 8/10* (2006.01)
*F21V 8/00* (2006.01)

(52) U.S. Cl.
CPC ............... *G02B 6/002* (2013.01); *F21S 48/225* (2013.01); *F21S 48/2225* (2013.01); *F21S 48/2231* (2013.01); *F21S 48/2237* (2013.01); *F21S 48/2268* (2013.01); *F21S 48/2281* (2013.01); *G02B 6/001* (2013.01); *G02B 6/0018* (2013.01); *G02B 6/0045* (2013.01); *G02B 6/0053* (2013.01); *G02B 6/0038* (2013.01)

(58) Field of Classification Search
CPC .. G02B 6/0033; G02B 6/0035; G02B 6/0036; G02B 6/0045; G02B 6/0018; G02B 6/0063; B60Q 1/0011; F21S 48/2231; F21S 48/2237; F21S 48/2225; F21S 48/225; F21S 48/1241

USPC ............. 362/511, 551, 555, 621, 23.09, 23.1
See application file for complete search history.

(56) References Cited

U.S. PATENT DOCUMENTS

| | | | | |
|---|---|---|---|---|
| 6,880,945 B2 * | 4/2005 | Knaack et al. | | 362/26 |
| 7,437,050 B2 * | 10/2008 | Bourdin et al. | | 385/146 |
| 7,494,257 B2 * | 2/2009 | Gebauer et al. | | 362/511 |
| 7,686,497 B2 * | 3/2010 | Kropac et al. | | 362/626 |
| 7,699,511 B2 * | 4/2010 | Kawaji | | B60Q 1/2665 |
| | | | | 362/459 |
| 2006/0067084 A1 * | 3/2006 | Stefanov | | 362/511 |
| 2008/0232135 A1 | 9/2008 | Kinder et al. | | |
| 2011/0103084 A1 * | 5/2011 | Zwick | | 362/511 |
| 2011/0235353 A1 | 9/2011 | Fukasawa et al. | | |

FOREIGN PATENT DOCUMENTS

| | | |
|---|---|---|
| DE | 19850443 | 4/2003 |
| EP | 1780463 | 5/2007 |
| WO | WO2009073470 | 6/2009 |
| WO | WO2010050137 | 5/2010 |

* cited by examiner

*Primary Examiner* — Robert May
(74) *Attorney, Agent, or Firm* — Jacox, Meckstroth & Jenkins

(57) ABSTRACT

A light guide comprising an external surface forming a guiding diopter, the guide being suitable for guiding light rays by reflection on the guiding diopter. The guide comprises at least one decoupling portion, with a refraction decoupling diopter arranged so as to refract light rays to decouple them from the guide, and thus transmit them out of the guide through the refraction decoupling diopter.

21 Claims, 8 Drawing Sheets

PRIOR ART

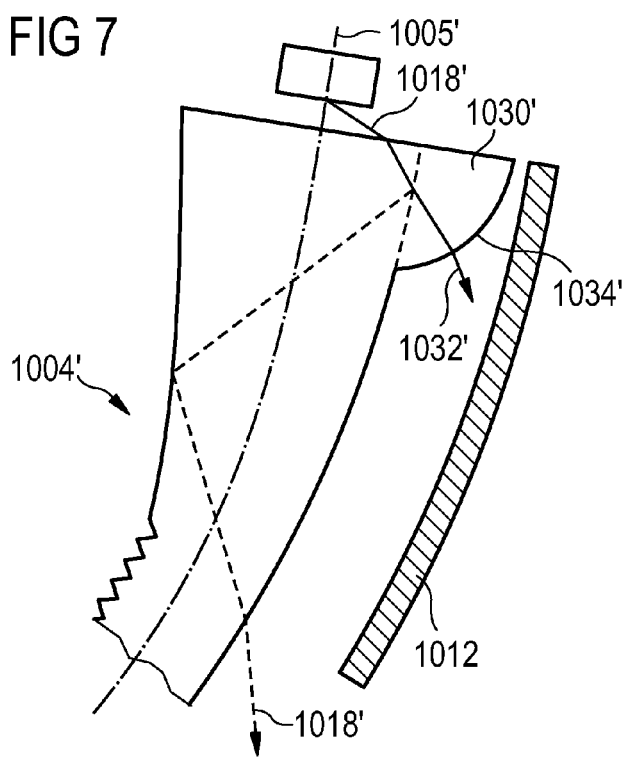
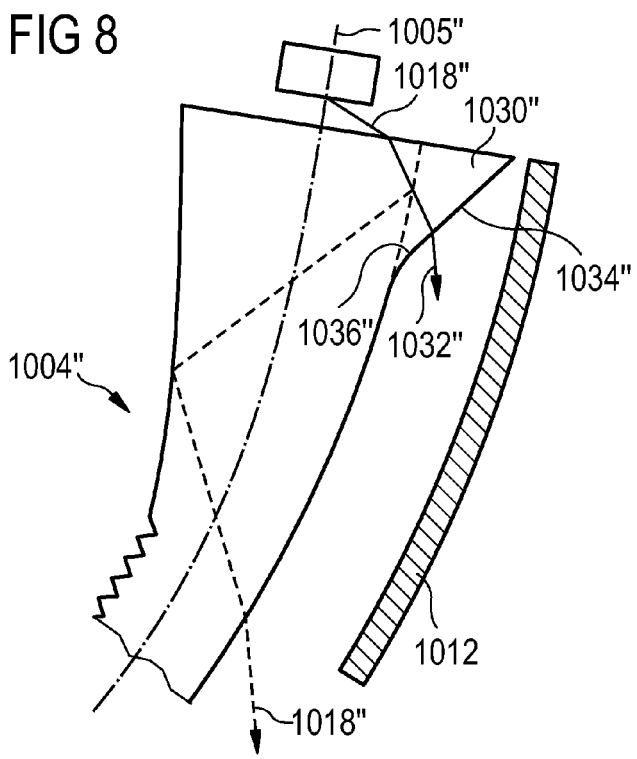

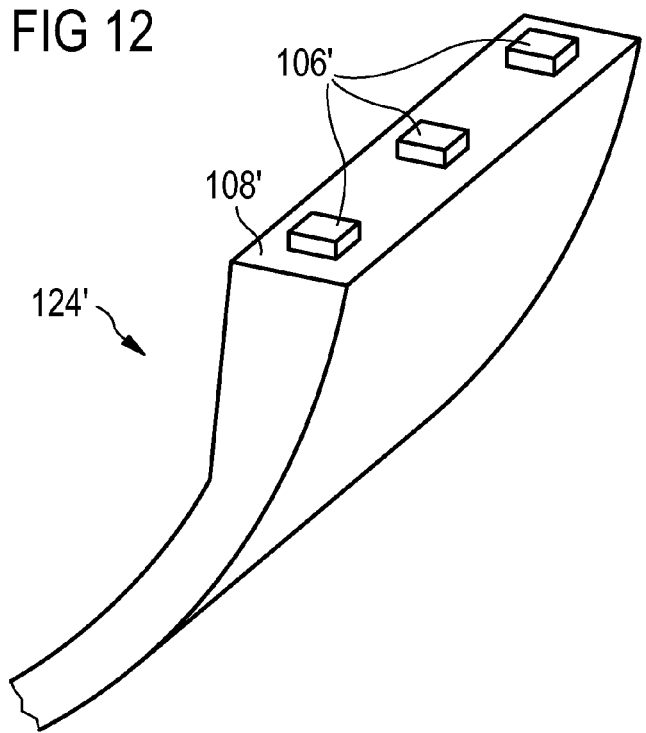
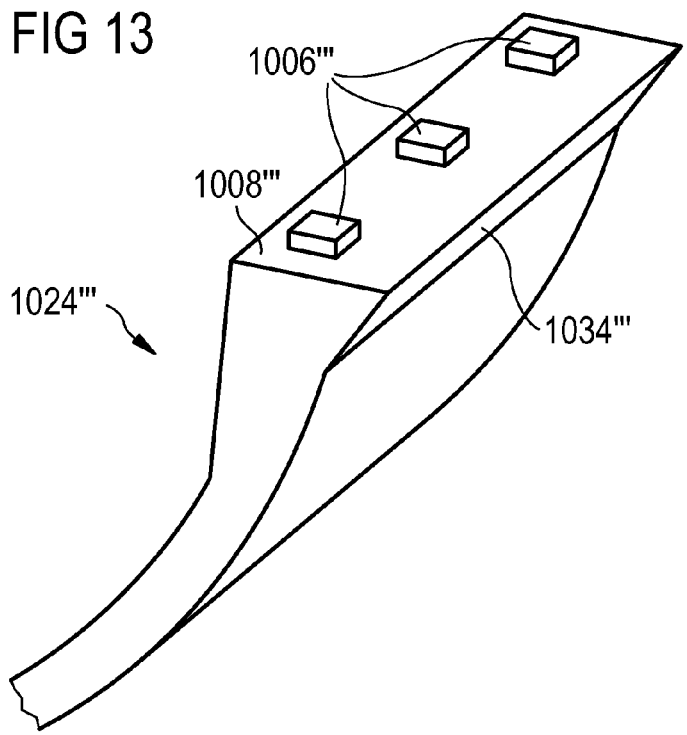

LIGHT GUIDE WITH DECOUPLING PORTION AND SHIELD COLLECTING THE DECOUPLED RAYS

CROSS-REFERENCE TO RELATED APPLICATIONS

This application claims priority to French Application No. 1155785 filed Jun. 29, 2011, which application is incorporated herein by reference and made a part hereof.

BACKGROUND OF THE INVENTION

1. Field of the Invention

The invention deals with a light guide that may be rectilinear or have a curved profile. The invention also deals with a lighting and/or signaling device, notably for a vehicle, the device comprising a light guide.

2. Description of the Related Art

In the field of motor vehicle lighting and signaling, it is increasingly commonplace to use optical guides. In practice, the optical guides present the advantage of being able to assume widely varied geometrical forms and bring a lighting surface even into inaccessible areas of the lighting and/or signaling device, thus contributing to the style of the device.

In the present application, the term "optical guide" is used to mean a transparent or translucent piece inside which light rays are propagated in a controlled manner from one of the ends of the guide, called "input face", to at least one output face. The controlled propagation is generally performed by internal reflections on various faces, called internal reflection faces or guiding diopter.

In some light guides, the internal reflection faces may return the light toward an output face other than the terminal face, so that an observer has the impression that the output face is lit and that this output face corresponds to a light source. According to certain embodiments, for example as is described in the patent application DE 198 50 443 A1 and the patent application EP 1 780 463 A1, this output face is notably one of the internal reflection faces. In other words, the external surface of the guide forms, with the ambient air, a diopter suitable, on the one hand, for ensuring the propagation of the rays along the guide by total reflection and, on the other hand, for allowing a portion of these rays to leave for the lighting or signaling function. In this case, some incident rays on a first internal reflection face are returned with an angle of incidence to a second internal reflection face, the angle of incidence being such that, instead of being reflected on the second internal reflection face, these rays are transmitted and leave the guide. These first internal reflection faces can be obtained by the presence of a series of prisms on a rear face of the external surface of the guide, as is described in the documents DE 198 50 443 A1 and EP 1 780 463 A1. Such optical guides comprising prisms make it possible to obtain the emission of a light whose appearance is uniform on the output face, when the guide is in the on state. In the teaching of the document DE 198 50 443 A1, the section of light guide extending from the end receiving the light rays from the light source to the succession of prisms has a variable section intended to deflect the rays being reflected on the diopter formed by this section, in order to improve the standardization of the lighting produced by the guide.

A certain problem may however arise in a light guide conforming to the abovementioned teaching, as illustrated in FIGS. 1 to 4 of the present application. FIG. 1 illustrates a lighting or signaling device 2 comprising a light guide 4 extending in a generally curved longitudinal direction 5. A light source 6 is arranged facing a rear end of the light guide 4 forming an input face 8 for the light rays intended to pass through the light guide 4. The light guide 4 comprises a series of reflecting facets 16 on a rear face so as to decouple a portion of the rays passing through the light guide 4, which then leave through the front face 17 of the light guide 4 for a lighting or signaling function in a main direction 14 of the lighting or signaling device 2. The rays 20 and 22 emitted by the light source 6 symmetrically relative to the longitudinal direction 5 undergo at least one reflection of total reflection type on the diopter formed by the external surface of the light guide 4 to then be decoupled by the reflecting facets 16 and participate in the lighting beam. The surface of the light guide 4 in fact forms a diopter between the material of the light guide 4 with a given refractive index (typically of the order of 1.6 for polycarbonate) and the ambient air with a different refractive index (very close to 1). This refractive index difference between two contiguous media results in the existence of a limiting angle of incidence beyond which the refraction is impossible and for which there is total reflection. In the case of a medium of polycarbonate surrounded by air, this limiting angle is of the order of 39° (according to the Snell-Descartes law). In the case of polymethacrylate, the refractive index is of the order of 1.5 and the limiting angle approximately 42°.

The lighting or signaling device 2 also comprises a shield 12 arranged facing the front face 17 of the light guide 4, the rear portion of the light guide 4 comprising the input face 8 and the light source 6. The objective of this shield 12 is to collect spurious rays such as the ray 18 which are decoupled before encountering the active decoupling area with the reflecting facets 16. These rays 18 which are among the most inclined relative to the input face 8 meet the diopter with an angle of incidence less than the limiting angle mentioned above and leave the light guide 4 with refraction. They are likely to generate a non-uniform and non-esthetic lighting. It is therefore necessary to make them invisible. The image produced is illustrated in FIG. 2 which shows the device seen by an observer arranged in front of the device. The light guide 4 is lit uniformly and a series of vertical lines corresponding to the edges of the reflecting facets can be observed. The shield 12 well masks the rear portion of the light guide 4, its non-uniformities and the light source 6.

For technical reasons relating to the fastening of the light guide 4, the fastening of the light source 6 on the light guide 4 and/or the mold stripping of the light guide 4, it may be necessary to provide a portion of the light guide 4 with a variable cross-section, more particularly the end comprising the input face 8 in proximity to the light source 6. In practice, the fastening of the light guide 4 at its end on the side of its input face 8 and the fastening of the light source 6 at this end may impose a design notably comprising fastening pins and shoulders at the end of the light guide 4. Such shapes may require the light guide 4 to have a clearance suitable for allowing a mold stripping in the longitudinal direction of the light guide 4, that is to say, a clearance with oppositely inclined edges. A device comprising such a light guide 4 is illustrated in FIG. 3 in which the details of its end with the fastening means have been omitted for reasons of clarity of explanation. Numerous elements forming the devices illustrated in this figure correspond to those of FIG. 1. A consistent numbering has been adopted to designate these various elements bearing in mind that the reference signs of FIG. 3 correspond to those of FIG. 1, except that they are increased by 100. The same applies for FIG. 4. Specific numbers have been used to designate the elements that are not present in FIG. 1.

The device 102 comprises a light guide 104 with a generally curved profile 105 and comprising a section 124 with variable cross-section extending from the input face 108 to the succession of reflecting facets 116 intended for the progressive decoupling of the light rays. Like the device of FIG. 1, the device 102 also comprises a shield 112 arranged in front of the rear portion of the light guide 104 extending from the input face 108 to the reflecting facets 116, this portion corresponding to the portion with variable cross-section. The rays 120 and 122 emitted by the light source 106 symmetrically relative to the longitudinal direction undergo at least one reflection of total reflection type on the diopter formed by the section with variable cross-section 124 to then be decoupled by the reflecting facets and participate in the lighting beam. The incident ray 118 on the input face 108 with an angle a little greater than that of the rays 120 and 122 will undergo a first total reflection on a front area of the diopter and then a second total reflection on a rear area of the diopter to then again encounter the diopter in a front area with an angle of incidence less than or equal to the limiting angle. It will thus be refracted and leave the light guide 104 in a direction close to the main lighting direction 114 without encountering the shield 112. This unwanted decoupling is caused by the reduction of the cross-section of the section 124 of the light guide 104 which, through a set of successive reflections, progressively reduces the angle of incidence of the rays, relative to the normal to the diopter formed by the light guide 104. Based on various parameters such as the length of the section with variable cross-section and the variability of its cross-section along its longitudinal direction, a portion of the rays 120, 122 emitted by the light source 106 leaves the section with variable cross-section of the light guide 104 without encountering the shield 112, such as the incident ray 118. These rays 120, 122 will generate a area of higher light intensity 126 in proximity to the edge of the shield 112, as is illustrated in FIG. 4. Such an area renders the lighting beam strongly non-uniform and consequently detrimental from a photometric point of view and from an esthetic point of view.

SUMMARY OF THE INVENTION

The aim of the invention is to propose a light guide and a lighting and/or signaling device that is suitable for overcoming at least one of the abovementioned drawbacks. More particularly, the aim of the invention is to propose a light guide and a lighting and/or signaling device suitable for generating a lighting image that is uniform, even more particularly that avoids areas of overintensity caused by imperfections of the guide linked to various assembly and/or manufacturing constraints.

The subject of the invention is a light guide comprising an external surface forming a guiding diopter, the guide being suitable for guiding light rays by reflection on the guiding diopter; noteworthy in that the guide comprises at least one decoupling portion, with a refraction decoupling diopter arranged so as to refract light rays to decouple them from the guide, and thus transmit them out of the guide through the refraction decoupling diopter.

Thus, an irregularity of the guiding diopter is deliberately formed, this irregularity being formed by the decoupling portion. The refraction decoupling diopter of this irregularity is arranged so as to refract light rays which, in the absence of the irregularity of the guiding diopter, would be reflected by the guiding diopter. Thus, these light rays will be decoupled from the guide, that is to say, they will no longer be propagated in the guide by successive internal reflections on its diopters. This makes it possible to have certain rays leave the guide early which would otherwise be reflected in numbers, with too great an angle of incidence on the portion of diopter opposite the one where they would be reflected, which would have created a non-uniformity on the guide, for example a more luminous spot. Thus, the creation of this irregularity makes it possible to improve the uniformity of the light appearance of the guide.

Preferentially, the light guide is a motor vehicle lighting and/or signaling device guide.

According to an advantageous embodiment, the guide has an input area admitting light rays. Advantageously, the rays are refracted by the refraction decoupling diopter directly after having entered into the guide through the input area or after having undergone a single reflection on the guiding diopter.

In the present application, the term "optical guide" is used to mean a transparent or translucent piece inside which light rays are propagated in a controlled manner from one of the ends of the guide, called "input face", to at least one output face. The controlled propagation is generally performed by internal reflections on various faces, called internal reflection faces or guiding diopter. Preferentially, the guide is intended for at least one light source, for example a light source of small size, such as a light-emitting diode, to be arranged in proximity to the input face. The light rays emitted by this source will be propagated in the optical guide to the face opposite the input face called "terminal face", via internal reflection faces, situated between the input face and the terminal face. According to an advantageous embodiment of the invention, the guide comprises at least two decoupling portions which are transversally opposite relative to the thickness of the guide. This makes it possible notably to eliminate more spurious rays. The thickness of the guide is the smallest dimension thereof, compared to its length for an approximately tubular guide, or compared to its width and its length for a surface guide (also called sheet guide).

According to another advantageous embodiment of the invention, the guide comprises a section of variable cross-section, preferentially forming a clearance or an unevenness, the or at least one of the decoupling portions being arranged on the section of variable cross-section. The clearance is oriented in such a way that the transversal cross-section decreases in the direction of propagation of the light. This clearance makes it possible to more easily perform the mold stripping of the guide in its manufacture. The clearance or the unevenness can be used to fasten the guide. Without the decoupling portion, this unevenness or this clearance would reflect rays with an angle such that, on arriving on the opposite face, they would not be transmitted by internal reflection but refracted. A non-uniformity would thus be observed.

The cross-section of the section preferentially varies in such a way that, without the refraction decoupling portion according to the invention, after a certain number of internal reflections the light would escape massively from the guide at the area of variable cross-section or at the start of the area of propagation. This would create an overintensity.

According to yet another advantageous embodiment of the invention, the section of variable cross-section is adjacent to one end of the guide, preferentially to an end comprising an input face admitting light into the guide. This makes it possible to fasten the guide as close as possible to the light source. Furthermore, the clearance offers greater benefit for the guide in the mold stripping operation.

According to yet another advantageous embodiment of the invention, the or at least one of the decoupling portions is arranged in proximity to the end of the guide so as to mostly decouple rays originating from the end of the guide without them being reflected by the guiding diopter. The rays reflected in proximity to the source are more likely to leave the guide once they have been reflected by the variable cross-section. The uniformity of the guide is therefore improved by thus positioning the decoupling portion.

According to yet another advantageous embodiment of the invention, the section of variable cross-section of the guide comprises means for fastening the guide. According to a variant embodiment, at least some of these fastening means are intended to fasten a light source such as an LED or else a printed circuit board (PCB) bearing this LED. In addition, or alternatively, some of these fastening means are intended to fasten the guide to a support, notably a lighting and/or signaling device module. Means for easily fastening the light guide are thus available, the decoupling portion making it possible to avoid having these means generate a light non-uniformity.

According to yet another advantageous embodiment of the invention, the decoupling diopter of the or at least one of the decoupling portions is generally inclined relative to the adjacent surface of the guiding diopter.

According to yet another advantageous embodiment of the invention, the or at least one of the decoupling portions forms a prismatic volume. This is a means that is simpler to produce.

According to yet another advantageous embodiment of the invention, the longitudinal cross-section of the or at least one of the decoupling portions comprises a curved profile. This makes it possible to reduce the thickness of the decoupling portion.

According to yet another advantageous embodiment of the invention, the external surface of the guide comprises, on a rear face of the guide, a series of reflecting facets intended to decouple by reflection rays passing through the guide, the or at least one of the decoupling portions of the diopter being arranged on the rear face and/or a front face opposite to the rear face. This guide makes it possible, by the series of facets, to decouple the rays all along the guide, which thus has one face lit over its entire length. Preferentially, the decoupling portion is placed before the series of facets, so as to decouple certain reflected rays before the series of facets.

Another subject of the invention is a lighting and/or signaling device for a vehicle comprising a light guide intended to be fed with light rays by a light source and having an optical axis corresponding to a main direction of lighting and/or of signaling; noteworthy in that the light guide conforms to the invention; and in that the device comprises at least one shield arranged so as to collect the rays leaving the or at least one of the decoupling portions. The shield thus masks these rays and prevents them from being seen.

According to a preferential variant embodiment, the lighting and/or signaling device also comprises a module, inside which the guide is fastened and a lens sealing this module. This lens allows light rays to pass, for example all the light rays coming into contact with this lens, or only the light rays of a certain color, in the case, for example, of a traffic light, such as a stop light, or a rear indicator light or a front indicator light. According to this variant embodiment, the shield makes it possible to prevent the rays from reaching the lens and therefore from leaving the lighting and/or signaling device.

Preferentially, the or at least one of the shields is arranged facing the decoupling portion relative to the optical axis of the lighting and/or signaling device, so as to conceal the decoupling portion. According to an advantageous embodiment of the invention, the guide comprises a section of variable cross-section preferentially forming a clearance, the or at least one of the decoupling portions being arranged on the section of variable cross-section, and the or at least one of the shields is arranged facing the section of variable cross-section relative to the optical axis of the device so as to conceal the section. It is thus possible to decouple the rays from the guide as close as possible to the shield, which facilitates their masking.

According to another advantageous embodiment of the lighting and/or signaling device according to the invention, the or at least one of the shields is facing the front face of the external surface of the guide. Preferably, the decoupling portion is situated on the front face. The front face is the face through which rays leave to participate in the lighting and/or signaling function. Preferentially, the external surface of the guide comprises, on a rear face of the guide, a series of reflecting facets intended to decouple by reflection rays passing through the guide, the or at least one of the decoupling portions of the diopter being arranged on the rear face or a front face opposite to the rear face, and the or at least one of the shields extends along the guide essentially from its end to the series of reflecting facets situated on the rear face of the guide.

According to another advantageous embodiment of the lighting and/or signaling device according to the invention, the or at least one of the shields is facing the rear face of the external surface of the guide. Preferably, the decoupling portion is situated on the rear face. The rear face is the face opposite the front face. Preferentially, the external surface of the guide comprises, on a rear face of the guide, a series of reflecting facets intended to decouple by reflection rays passing through the guide, the or at least one of the decoupling portions of the diopter being arranged on the rear face or a front face opposite to the rear face, and the or at least one of the shields extends along the series of reflecting facets facing the rear face of the external surface of the guide.

According to yet another advantageous embodiment of the lighting and/or signaling device according to the invention, the section of variable cross-section of the guide comprises means for fastening the guide to a guide support in the module of the lighting and/or signaling device.

According to a variant embodiment, the light guide according to the invention is of linear, curved, straight or ring type. According to another variant embodiment, the light guide is a surface guide. The expression linear should be understood to mean a guide which takes the form of a ring, a straight or curved rod, preferably intended for a light source to be placed at one of its ends. By contrast, a surface guide takes the form of a plate, a panel, which may be planar or curved, preferentially intended to be used with a number of light sources distributed edgewise on one of the edges of the panel.

Other features and advantages of the present invention will be better understood from the description and the drawings in which:

BRIEF DESCRIPTION OF THE ACCOMPANYING DRAWINGS

FIG. 7 is a cross-sectional view of a portion of a lighting and/or signaling device constituting a first alternative to the one of FIG. 5;

FIG. 8 is a cross-sectional view of a portion of a lighting and/or signaling device constituting a second alternative to that of FIG. 5;

FIG. 12 is a perspective view of an alternative to the light guide of FIG. 3, in which the light guide is configured to be of "bar" type; and FIG. 13 is a perspective view of an alternative to the light guide of the first embodiment of the invention according to FIG. 5, the light guide being of a "bar" type configuration.

DETAILED DESCRIPTION OF THE PREFERRED EMBODIMENTS

In the description which follows, the terms qualifying the position of certain elements, such as "front", "rear", "in front", "behind", "horizontal", "vertical", etc. refer to the specific arrangements of the figures. These terms should not however be interpreted strictly and absolutely but quite relatively. In fact, the signaling devices which are described therein may in practice be oriented differently without in any way departing from the invention.

Certain constituent elements of the light devices and guides illustrated in FIGS. 5, 7, 8, 9, 10, 11, 12 and 13 correspond to those of FIGS. 1 to 4. A consistent numbering has been adopted to designate these different elements bearing in mind that the reference signs of FIG. 5 correspond to those of FIG. 1 except that they are uprated by 1000. The same applies for FIG. 9 in which they are uprated by 10 000, for FIG. 10 in which they are uprated by 100 000 and for FIG. 11 in which they are uprated by 1 000 000. With regard to FIGS. 7, 8 and 13, the numbering corresponds to that of FIG. 5, except that the reference signs of FIG. 7 are supplemented with a prime sign ', the reference signs of FIG. 8 are supplemented with a double prime sign ", and the reference signs of FIG. 13 are supplemented with a triple prime sign '''. The reference signs of FIG. 12 correspond to those of FIG. 2 except that the reference signs of FIG. 12 are supplemented with a prime sign '. Numbers specific to each exemplary embodiment have been employed to designate the elements that are not present in FIGS. 1 to 4.

Figure 5:
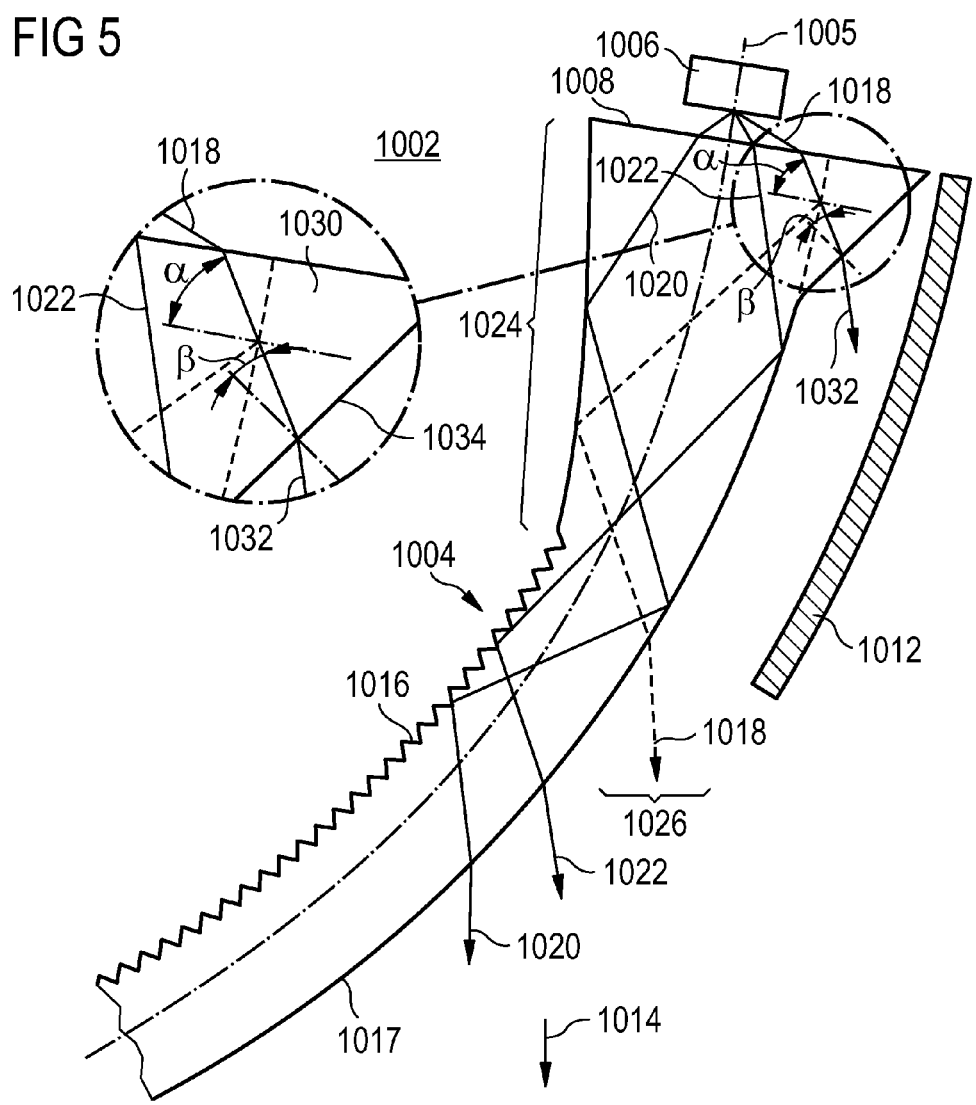
FIG. 5 is a cross-sectional view of a lighting and/or signaling device according to a first embodiment of the invention.
Figure 6:
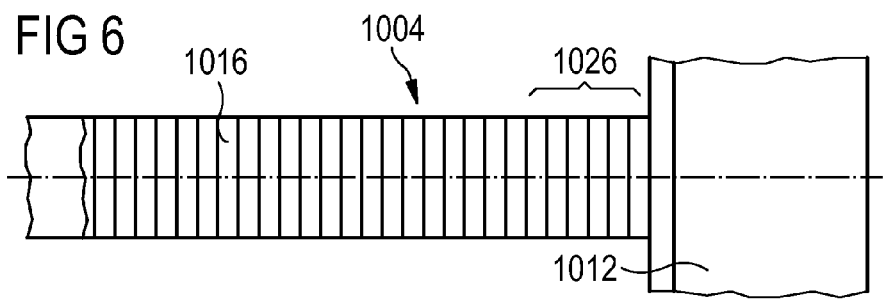
FIG. 6 is a front view of the device of FIG. 5 when the latter is operating.

FIGS. 5 and 6 illustrate a first embodiment of the invention. The lighting and/or signaling device 1002 of FIG. 5 comprises a light guide 1004 of generally curved profile in a longitudinal direction 1005 represented by a broken line of axis line type. The light guide 1004 is made of a transparent material such as polycarbonate or polymethacrylate. The refractive index of the transparent material (typically of the order of 1.6 for polycarbonate) different to that of the air surrounding the light guide 1004 (of the order of 1) causes the external surface of the light guide 1004 to constitute a diopter suitable for refracting and reflecting light rays encountering it. More specifically, the rays 1020 and 1022 emitted by the light source 1006 generally symmetrically relative to the longitudinal direction undergo at least one reflection of the total reflection type on the diopter formed by the external surface of the light guide 1004 to then be decoupled by the reflecting facets 1016 and participate in the lighting beam in the main direction of lighting 1014 of the device.

The light guide 1004 comprises a section 1024 extending from the input face 1008 admitting the light rays 1020, 1022 emitted by the light source 1006. The section 1024 has a variable transversal cross-section. More specifically, its external surface 1025 forming a portion of the diopter of the light guide 1004 forms a clearance oriented in such a way that the cross-section decreases from the input face 1008 to the end of the section. The latter preferentially extends to the area of regular transversal cross-section with the reflecting facets 1016. In the particular case of FIG. 5, the section of variable cross-section 1024 has, in a horizontal plane, a cross-section with two profiles that are inclined relative to the longitudinal direction. The rear profile is generally straight and the front profile is generally curved. The external surface 1025 of the section 1024 consequently forms a diopter in the form of a sealed jacket whose cross-section decreases along its main direction in the direction of travel of light rays.

The section with variable cross-section 1024 also comprises a decoupling portion 1030 for decoupling certain rays. This decoupling portion 1030 is generally prismatic in form. It is arranged in a front area of the section 1024, more particularly at the input face 1008 admitting the rays. Its cross-section in a horizontal plane comprises an inclined edge or surface 1034 relative to the adjacent edge. This decoupling portion 1030 constitutes a complement or a protrusion of material which enables most of the rays passing through it to leave the diopter by refraction. In practice, the ray 1018 which has an angle of incidence relative to the input face 1008 which is greater than the ray 1022 will be propagated in the material of the light guide 1004 in a direction that is more inclined relative to the longitudinal direction of the light guide 1004 and will encounter the external surface of the light guide 1004 forming part of the decoupling portion 1030. The angle of incidence β of the ray 1018 with this edge or surface 1034 is less than the limiting angle between the refraction and total reflection, so that it will be refracted by this part of the diopter and leave the light guide 1004. In FIG. 5, this leaving refracted ray is referenced 1032. This ray 1032 will then encounter the shield 1012 and will not be visible to an observer of the device in operation. Without the decoupling portion 1030, the ray 1018 would encounter the external surface 1028 of the section 1024 which is represented by a dotted line with an angle of incidence α substantially greater than the angle of incidence β with the inclined surface 1034 of the decoupling portion 1030. This angle of incidence α is greater than the limiting angle of the diopter, so that the ray 1018, without the decoupling portion 1030, would be reflected to reach the opposite face situated in the area of variable cross-section, in this example in the clearance. Because of this variable cross-section, this ray 1018 would be reflected with an angle such that, on once again reaching the face where it had been reflected a first time, it would finally leave the section 1024 and would generate an area of extra brightness as was described in relation to FIGS. 3 and 4. Such a ray is illustrated by a dotted line in FIG. 5.

The image produced by the lighting device 1002 of FIG. 5 can be seen in FIG. 6 which corresponds to a front view of the device in operation. No area of excess brightness or over-illumination can be seen in an area 1026 in proximity to the shield 1012.

It should be noted that the decoupling portion 1030 illustrated in FIG. 5 may take various forms as illustrated in FIGS. 7 and 8.

FIG. 7 illustrates a first variant of the light guide 1024 of FIG. 5. Unlike the guide of FIG. 5, the decoupling portion 1030' of the light guide 1004' is no longer prismatic but at least partially curved. More specifically, the external surface 1034' forming the decoupling diopter is now curved. In FIG. 5, the decoupling portion 1030 comprises a point situated on the input face 1008, at the end of the light guide 1004. In the variant in FIG. 7, the curvature makes it possible to reduce the thickness of the unevenness forming the decoupling portion 1030'. The decoupling portion 1030' still makes it possible to decouple most of the rays likely to create a non-uniformity. The ray 1018' encounters the external surface 1034' of the decoupling portion 1030'. The outgoing ray 1032' is stopped by the shield 1012.

FIG. 8 illustrates a second variant of the light guide 1024 of FIG. 5. Unlike the guide of FIG. 5, the decoupling portion 1030" of the guide 1004" comprises an area 1036" forming an absence of connection with the rest of the section of light guide 1024". Similarly to what has been described in relation to FIG. 5, the ray 1018" encounters the external surface 1034" of the light guide 1024" forming part of the decoupling portion 1030" with an angle of incidence less than the limiting angle of the diopter, despite the presence of the absence of connection or area 1036". The latter makes it possible to avoid the abrupt changes of slope and thus facilitate the manufacture and improve the mechanical robustness of the part.

Figure 9:
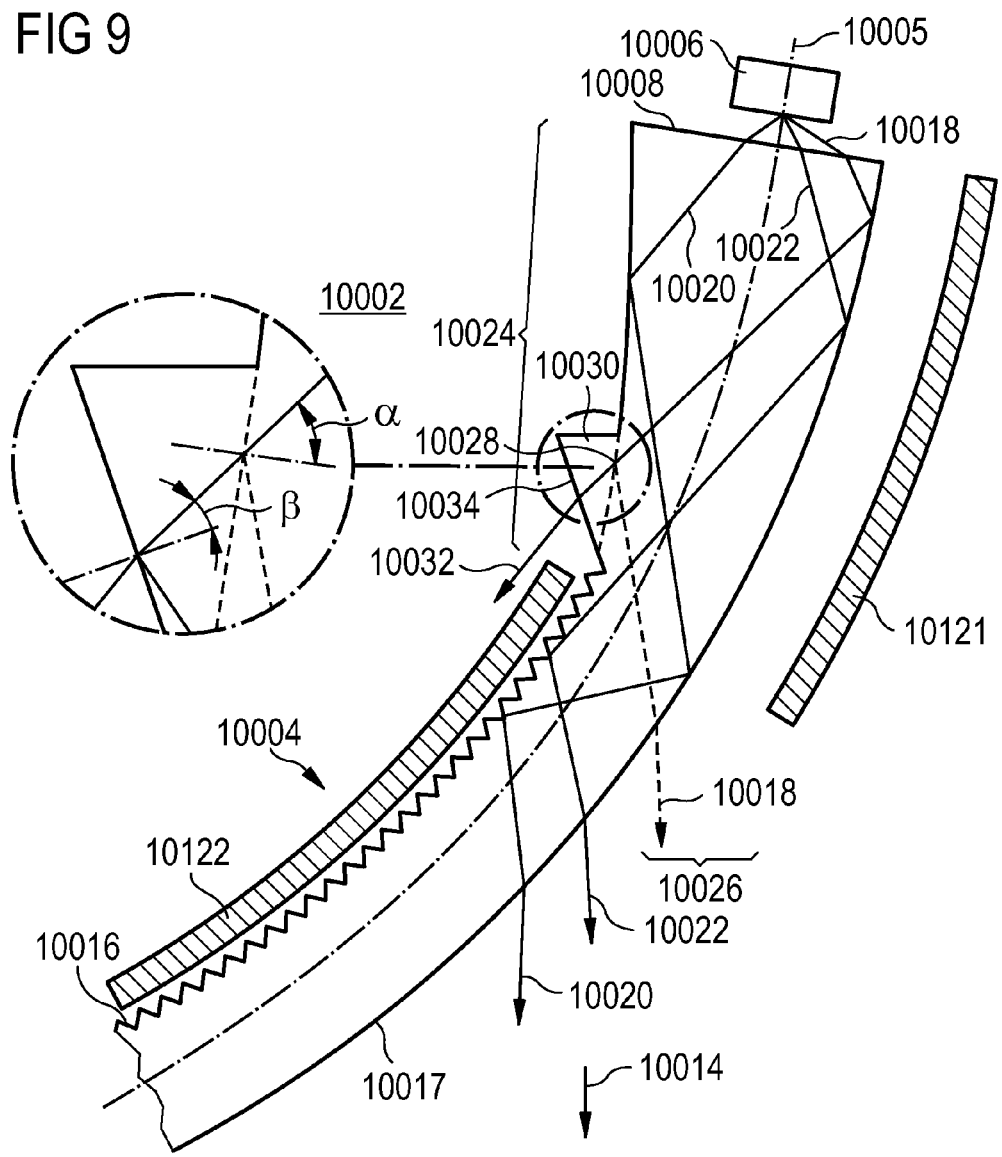
FIG. 9 is a cross-sectional view of a lighting and/or signaling device according to a second embodiment of the invention.
Figure 10:
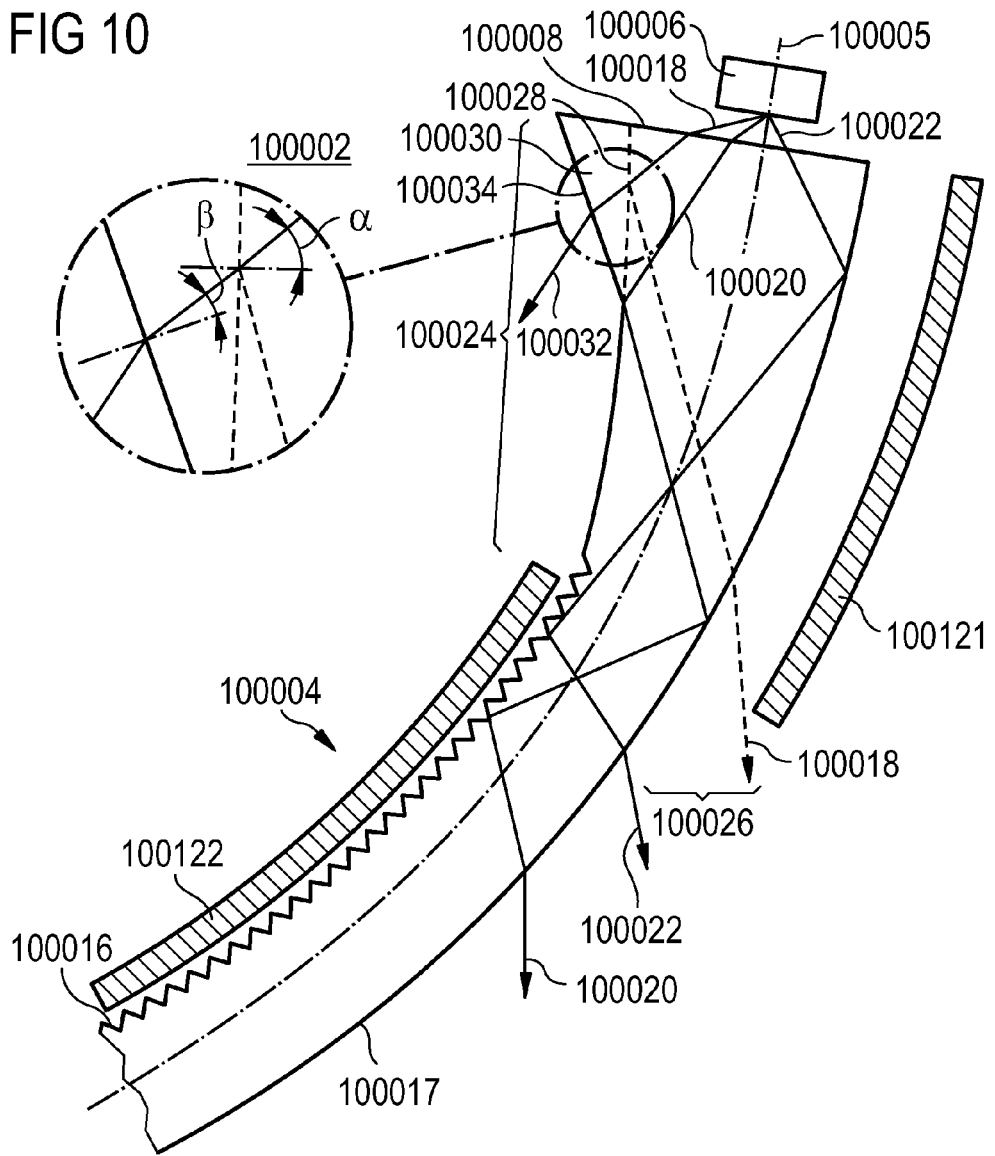
FIG. 10 is a cross-sectional view of a lighting and/or signaling device according to a third embodiment of the invention.
Figure 11:
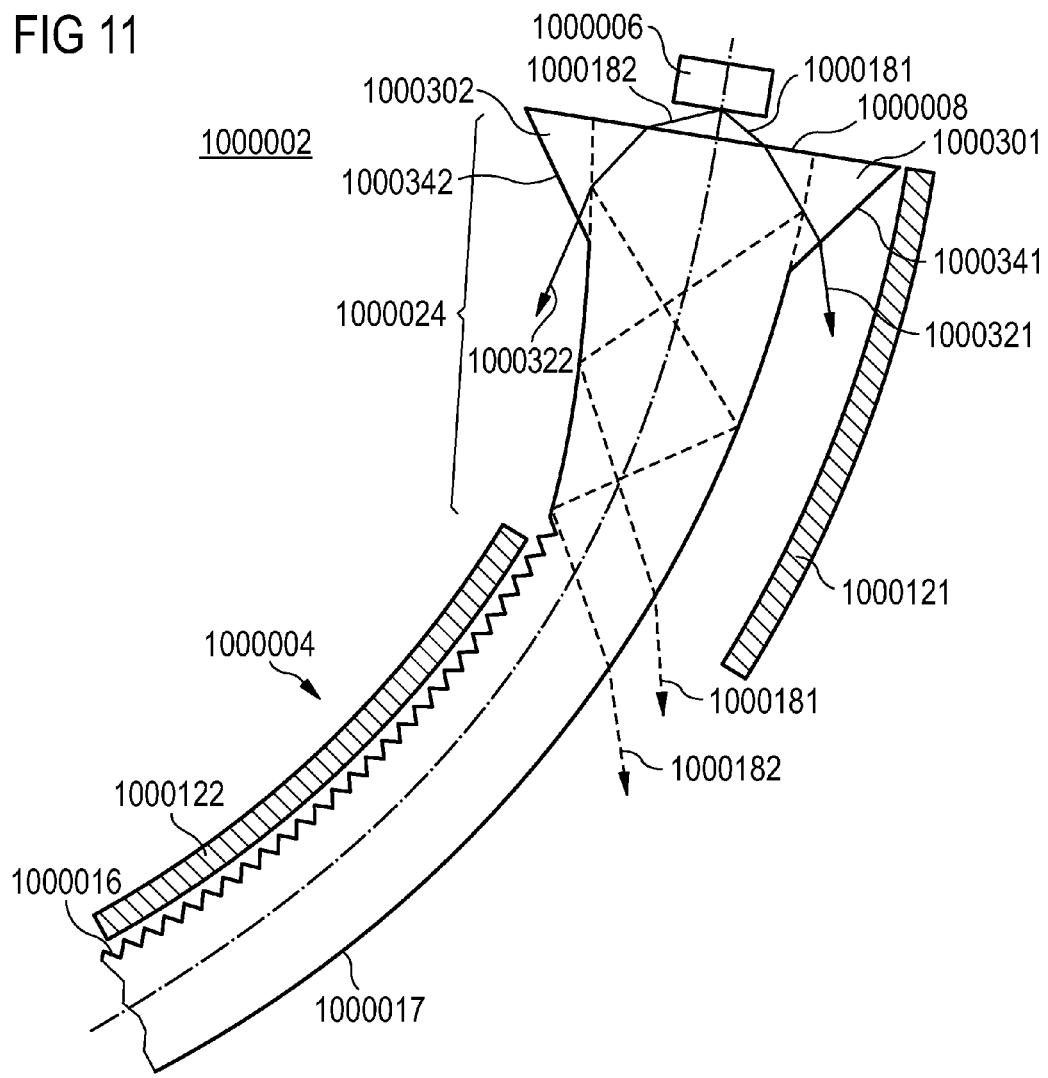
FIG. 11 is a cross-sectional view of a lighting and/or signaling device according to a fourth embodiment of the invention.

The decoupling portions 1030, 1030' and 1030" illustrated in FIGS. 5, 7 and 8 can be positioned at various points of the guide 1004, 1004' and 1004" as will be illustrated in relation to FIGS. 9, 10 and 11. The latter illustrate other exemplary embodiments of the invention. These examples constitute variants of the example of FIG. 5.

FIG. 9 illustrates a second embodiment of the invention. The lighting and/or signaling device 10002 comprises, similarly to that of FIGS. 5 and 6, a light guide 10004 of generally curved profile in a longitudinal direction 10005, with a section with variable cross-section 10024, and a first shield 10121 arranged in front of the section 10024. The light guide 10004, more particularly the section with variable cross-section comprises a decoupling portion 10030 arranged in a rear area of the section 10024 and away from the input face 10008. This decoupling portion 10030 makes it possible to have most of the rays passing through it leave, so as to avoid a reflection of these rays followed by an exit of the rays through a front area of the diopter without encountering the first shield 10121. A second shield 10122 is arranged at the rear of the light guide 10004, more specifically at the rear of the section 10024 with generally constant cross-section, comprising the succession of reflection facets 10016. The second shield 10122 makes it possible to collect the rays leaving the decoupling portion 10030.

The decoupling portion 10030 is arranged at a distance from the input face 10008 so as to be passed through by rays likely to leave the diopter without encountering the first shield 10121 and that have each already undergone at least one prior reflection on the diopter. In the specific case of FIG. 9, the ray 10018 illustrating this phenomenon undergoes a first reflection on a front area of the diopter to then be propagated through the section with variable cross-section 10024 to the decoupling portion 10030. Similarly to the decoupling portion 1030 of FIG. 5, the decoupling portion 10030 comprises a complement or boss of transparent material so as to form an output surface 10034 inclined relative to the adjacent surface or even relative to the surface 10028 that the diopter would form in the absence of the decoupling portion 10030. The result thereof is that the ray 10018 passing through the decoupling portion encounters the output surface 10034 with an angle of incidence β which is less than the angle of incidence α with the surface 10028 in the absence of the decoupling portion 10030. The angle of incidence α is greater than the limiting angle, so that the ray 10018 would be reflected, transmitted and decoupled as represented by dotted lines so as to participate in an area 10026 of undesirable lighting overintensity. The angle of incidence β is less than the limiting angle of the diopter. The ray 10018 will therefore be transmitted and refracted by the diopter towards the rear of the guide to then be collected by the second shield 10122. In FIG. 9, this outgoing refracted ray is referenced 10032.

FIG. 10 illustrates a third embodiment of the invention. This case differs from the preceding ones. In the cases illustrated by FIGS. 5, 7, 8 and 9, the nuisance rays would undergo at least two internal total reflections before being massively decoupled, without the decoupling portion according to the invention. The embodiments of FIGS. 5, 7, 8 and 9 then aim to eliminate one of these total reflections to eliminate the nuisance spot. In the embodiment of FIG. 10, a single total reflection before decoupling would be undergone without the decoupling portion, and it is this reflection that is eliminated. The lighting and/or signaling device 100002 comprises, like that of FIGS. 5, 7, 8 and 9, a light guide 100004 of generally curved profile in a longitudinal direction 100005, with a section with variable cross-section 100024, and a first shield 100121 arranged in front of the section. The guide 100004, more particularly the section with variable cross-section, comprises a decoupling portion 100030 arranged in a rear area of the section at the input face 100008. This decoupling portion 100030 makes it possible to have most of the rays passing through it exit, so as to avoid a reflection of these rays followed by an output of the rays through a front area of the diopter without encountering the first shield 10121. Similarly to the device of FIG. 9, a second shield 100122 is arranged at the rear of the guide, for example, as illustrated in FIG. 10, at the rear of the section with generally constant cross-section, comprising the succession of reflection facets 100016. The second shield 100122 makes it possible to collect the rays leaving the decoupling portion 100030.

Similarly to the devices of FIGS. 5, 7 and 8, the decoupling portion 100030 is arranged at the input face 100008. It is, however, arranged in a rear area of the diopter so as to transmit the rays towards the rear of the device. It makes it possible to transmit most of the rays which, without this portion, would encounter the corresponding area 100028 of the diopter and would be mostly reflected and transmitted through a front area of the diopter so as to participate in the formation of an area of lighting overintensity. Similarly to the decoupling portion 1030 of FIG. 5 and the decoupling portion 10030 of FIG. 9, the decoupling portion 100030 comprises a complement or boss of transparent material so as to form an output surface 100034 inclined relative to the adjacent surface or even relative to the surface 100028 that the diopter would form without the decoupling portion 100030. The result thereof is that the ray 100018 passing through the decoupling portion encounters the diopter 100034 with an angle of incidence β which is less than the angle of incidence α with the diopter 100028 without the portion. The angle of incidence α is greater than the limiting angle, so that the ray 100018 would be reflected, transmitted and decoupled as represented by dotted line so as to participate in an area 100026 of undesirable lighting overintensity. The angle of incidence β is less than the limiting angle of the diopter. The ray 100018 will therefore be transmitted and refracted by the diopter toward the rear of the guide to then be collected by the second shield 100122. In FIG. 10, this outgoing refracted ray is referenced 100032.

FIG. 11 illustrates a fourth embodiment of the invention. This is essentially a combination of the first and third embodiments of FIGS. 5 (or 7 or 8) and 10. The light guide 1000004 comprises two decoupling portions 1000301 and 1000302 at the input face 1000008, a first decoupling portion 1000301 on the front face 1000017 of the light guide 1000004 and a second decoupling portion 1000302 on a rear face of the guide 1000004. The first decoupling portion 1000301 essentially corresponds to the decoupling portion 1030 of FIG. 5, and the second decoupling portion 1000302 essentially corresponds to the decoupling portion 100030 of FIG. 10.

A first ray 1000181 emitted toward the front by the light source 1000006 encounters the external surface of the first decoupling portion 1000301 with an angle of incidence less than the limiting angle of the diopter and is then refracted to form the outgoing ray 1000321, similarly to the rays 1018 and 1032 of FIG. 5 cooperating with the decoupling portion 1030. A second ray 1000182 emitted toward the rear by the light source 1000006 encounters the external surface of the second decoupling portion 1000302 with an angle of incidence less than the limiting angle of the diopter and is then refracted to form the outgoing ray 1000322, similarly to the rays 100018 and 100032 of FIG. 10 cooperating with the decoupling portion 100030.

FIGS. 3 to 11 illustrate longitudinal guide sections that may for example be tubular, in bar form, or in sheet form. FIGS. 12 and 13 illustrate embodiments of light guides in bar form or in the form of surface guides.

Figure 1:
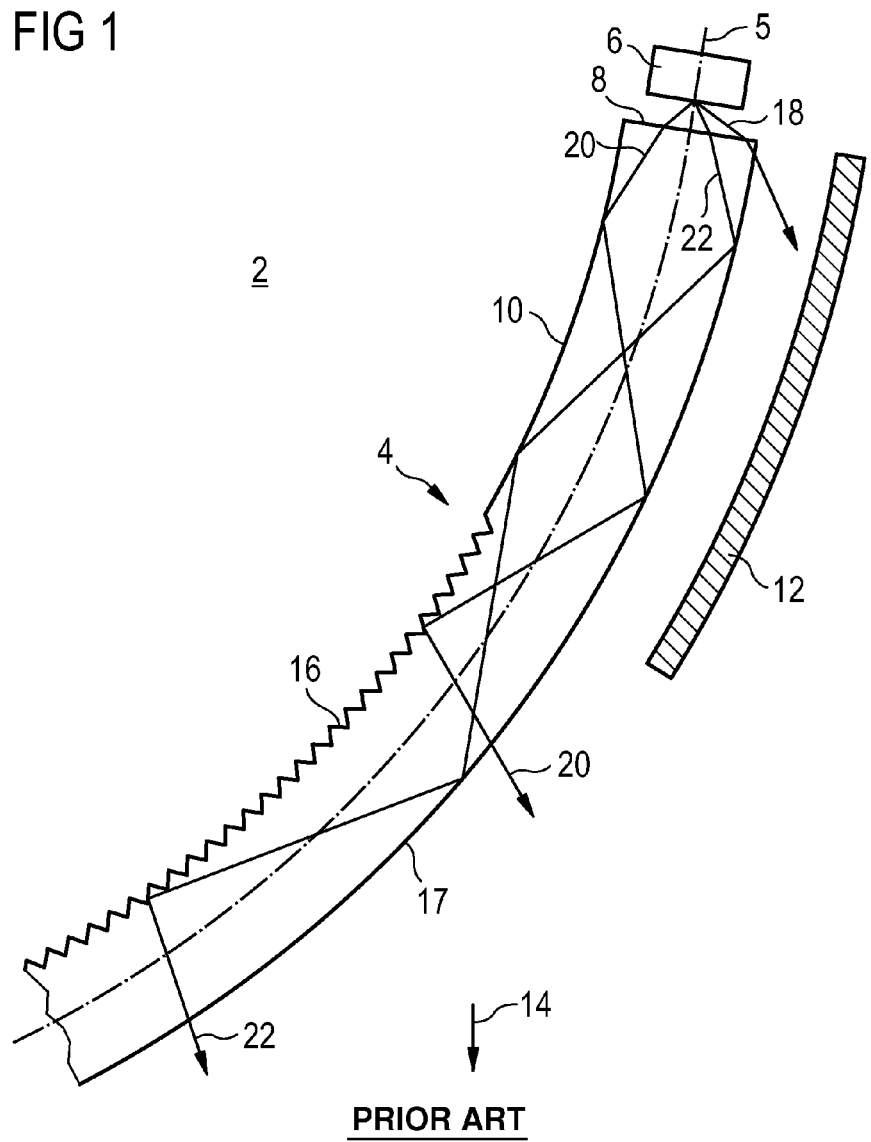
FIG. 1 is a cross-sectional view of a first known lighting and/or signaling device.
Figure 2:
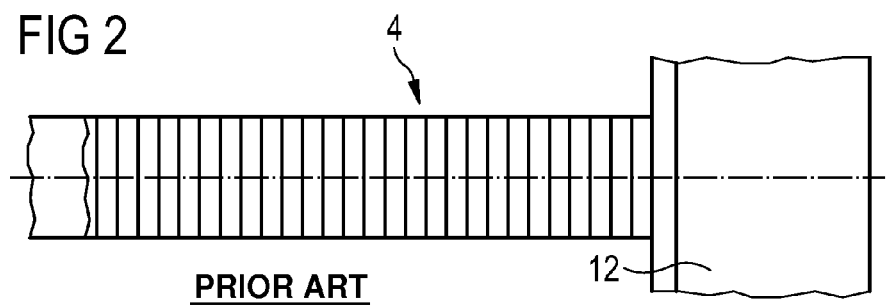
FIG. 2 is a front view of the device of FIG. 1 when the latter is operating.
Figure 3:
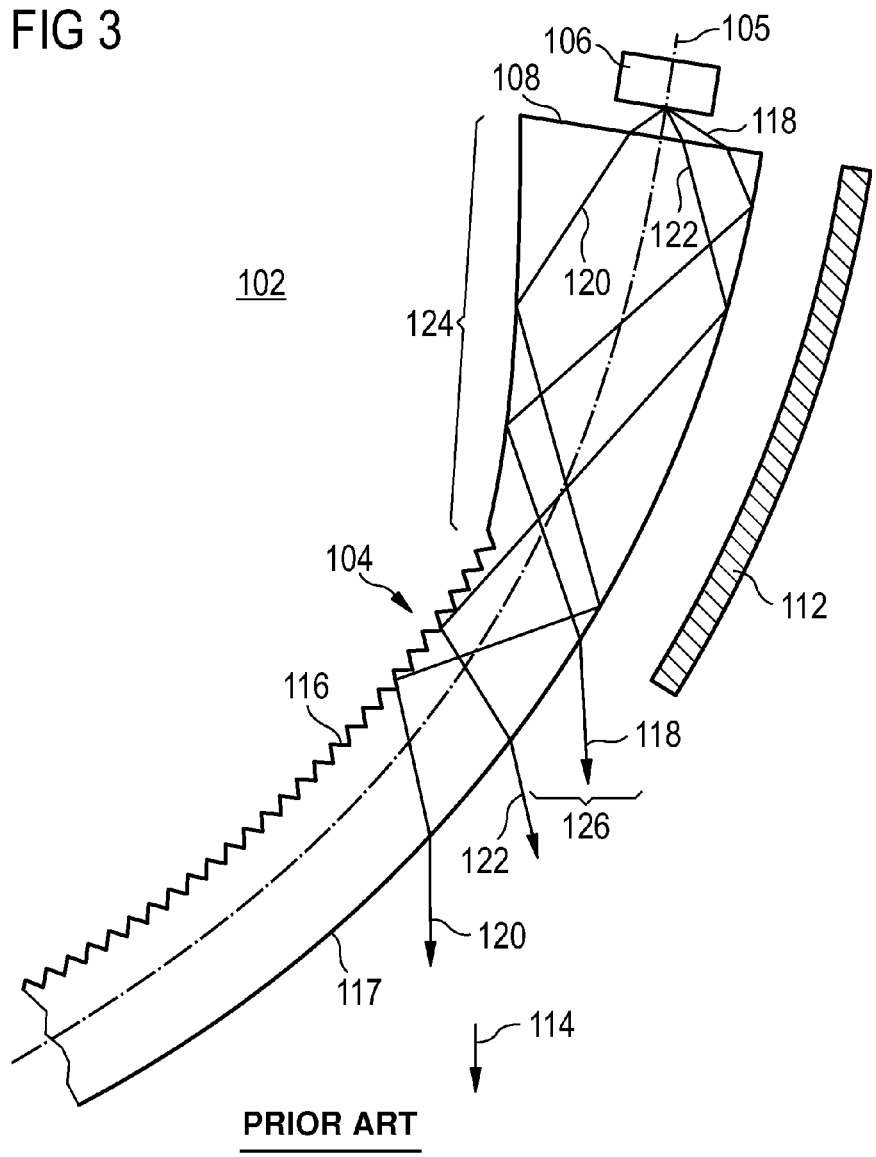
FIG. 3 is a cross-sectional view of a second known lighting and/or signaling device.
Figure 4:
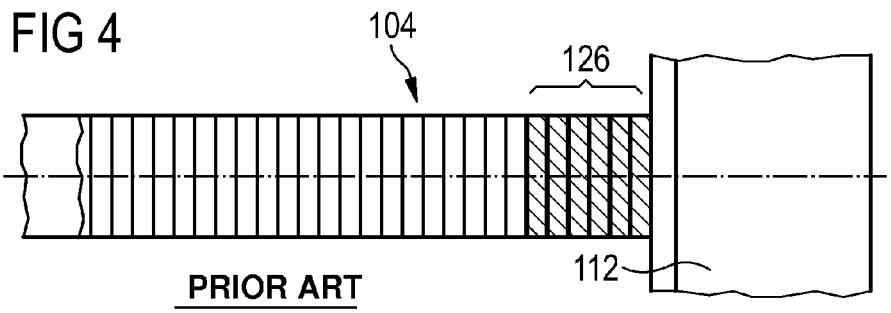
FIG. 4 is a front view of the device of FIG. 3 when the latter is operating.

More particularly, FIG. 12 illustrates, in perspective, an embodiment of the light guide that has a longitudinal section identical to that of FIG. 3. Its input face has an elongate rectangular form. In the case of such an embodiment, a number of light sources 106' can be arranged along the input surface 108' of the light guide 124'. The problems described in relation to the corresponding light guide of FIG. 3 are also applicable to the guide of FIG. 12.

FIG. 13 illustrates, in perspective, an embodiment of the light guide that has a longitudinal section identical to that of FIG. 5. Its input face has an elongate rectangular form. A number of light sources 1006''' can then be arranged or distributed along the elongate input surface 1008'''. The decoupling portion 1034''' then has a corresponding rectangular cross-section. All the phenomena described in relation to FIGS. 5 and 6 are similarly present here. It should also be noted that the bar-form embodiment of the light guide is applicable to all the embodiments of the invention which have been described.

The embodiments which have just been detailed are purely illustrative and given as examples. In practice, it should be noted that the decoupling portion can take various forms so long as it performs its decoupling function. The output surface does not necessarily have to have a rectilinear profile but can also be curved. Furthermore, the guide may comprise a number of decoupling portions, notably based on the various design and dimensioning constraints. These decoupling portions may, for example, be distributed longitudinally or on the circumference of the guide.

Generally, the cross-section of the light guide can take various forms provided that they form a closed contour.

While the system and apparatus herein described constitute preferred embodiments of this invention, it is to be understood that the invention is not limited to this precise system and apparatus, and that changes may be made therein without departing from the scope of the invention which is defined in the appended claims.

What is claimed is:

1. A light guide comprising an external surface forming a guiding diopter, said light guide being suitable for guiding light rays by reflection on said guiding diopter;
wherein said light guide comprises a section comprising at least one decoupling portion, with a refraction decoupling diopter arranged so as to refract light rays to cause at least a portion of said light rays to leave said light guide and transmit them out of said light guide through said refraction decoupling diopter;
said at least one decoupling portion being arranged in substantial proximity to an input end of said light guide and defining a variable cross-section that generally decreases as it extends from an input face of said light guide to an end of said at least one decoupling portion, wherein said at least a portion of said light rays originating from said input end of said light guide are not reflected by said guiding diopter;
said at least one decoupling portion comprising an external surface arranged such that an angle of incidence of said at least a portion of said light rays with said external surface is less than a limiting angle between a refraction and a total reflection so that said at least a portion of said light rays passing through said at least one decoupling portion will be refracted by said at least one decoupling portion out of and away from said light guide;
wherein said light guide further comprises at least one shield spaced apart from and generally opposed to said at least one decoupling portion and arranged so as to collect said portion of said light rays leaving said at least one decoupling portion and reflect them back into said light guide.

2. The light guide according to claim 1, wherein said light guide comprises at least two decoupling portions which are transversally opposite relative to a thickness of said light guide.

3. The light guide according to claim 2, wherein said light guide comprises a section of variable cross-section forming a clearance or an unevenness, at least one of said at least two decoupling portions being arranged on said section of variable cross-section.

4. The light guide according to claim 2, wherein at least one of said at least two decoupling portions forms a prismatic volume.

5. The light guide according to claim 2, wherein a longitudinal cross-section of at least one of said at least two decoupling portions comprises a curved profile.

6. The light guide according to claim 2, wherein said external surface comprises, on a rear face of said light guide, a series of reflecting facets intended to decouple by reflection rays passing through said light guide at least one of said at least two decoupling portions of said light guide being arranged on a rear face and/or a front face opposite to said rear face.

7. The light guide according to claim 1, wherein said variable cross-section is adjacent to said input end of said light guide that comprises said input face admitting light into said light guide.

8. The light guide according to claim 7, wherein said at least one decoupling portion is arranged in proximity to said input end of said light guide so as to mostly decouple light rays originating from said input end of said light guide without them being reflected by said guiding diopter.

9. The light guide according to claim 7, wherein said variable cross-section of said light guide comprises means for fastening said light guide.

10. The light guide according to claim 1, wherein said variable cross-section of said light guide comprises means for fastening said light guide.

11. The light guide according to claim 1, wherein said refraction decoupling diopter of said at least one decoupling portion is generally inclined relative to an adjacent surface of said guiding diopter.

12. The light guide according to claim 1, said at least one decoupling portion forms a prismatic volume.

13. The light guide according to claim 1, wherein a longitudinal cross-section of said at least one decoupling portion comprises a curved profile.

14. The light guide according to claim 1, wherein said external surface comprises, on a rear face of said light guide, a series of reflecting facets intended to decouple by reflection rays passing through said light guide, said least one decoupling portion of said light guide being arranged on a rear face and/or a front face opposite to said rear face.

15. The light guide according to claim 1, wherein said variable cross-section of said light guide comprises means for fastening said light guide.

16. A lighting and/or signaling device for a vehicle comprising a light guide intended to be fed with light rays by a light source and having an optical axis corresponding to a main direction of lighting and/or of signaling;
said light guide comprising an external surface forming a guiding diopter, said light guide being suitable for guiding light rays by reflection on said guiding diopter;
wherein said light guide comprises at least one decoupling portion, with a refraction decoupling diopter arranged so as to refract light rays to decouple them from said light guide, and thus transmit them out of said light guide through said refraction decoupling diopter;
wherein said at least one decoupling portion is arranged in substantial proximity to an input end of said light guide so that said at least a portion of said light rays originating from said input end of said light guide are not reflected by said guiding diopter;
said at least one decoupling portion comprising an external surface arranged such that an angle of incidence of said at least a portion of said light rays with said external surface is less than a limiting angle between a refraction and a total reflection so that said at least a portion of said light rays passing through said at least one decoupling portion will be refracted by said at least one decoupling portion out of and away from said light guide; and
at least one shield generally opposed to said at least one decoupling portion near said input end of said light guide so as to collect said portion of said light rays leaving said at least one decoupling portion and reflect them back into said light guide.

17. The lighting and/or signaling device according to claim 16, wherein said at least one shield is facing a front face of an external surface of said light guide.

18. The lighting and/or signaling device according to claim 16, wherein said at least one shield is facing a rear face of an external surface of said light guide.

19. A light guide comprising an external surface forming a guiding diopter, said light guide being suitable for guiding light rays by reflection on said guiding diopter;
wherein said light guide comprises at least one decoupling portion, with a refraction decoupling diopter arranged so as to refract light rays to decouple them from said light guide, and thus transmit them out of said light guide through said refraction decoupling diopter;
wherein said at least one decoupling portion is arranged in substantial proximity to an input end of said light guide so that said at least a portion of said light rays originating from said input end of said light guide are not reflected by said guiding diopter, wherein said light guide comprises a rear face having a series of reflecting facets;
said at least one decoupling portion comprising an external surface arranged such that an angle of incidence of said at least a portion of said light rays with said external surface is less than a limiting angle between a refraction and a total reflection so that said at least a portion of said light rays passing through said at least one decoupling portion will be refracted by said at least one decoupling portion out of and away from said light guide; and
wherein at least one shield extends along said light guide essentially from said input end of said light guide to said series of reflecting facets and an additional shield opposed to said decoupling portion so as to collect said portion of said light rays leaving said at least one decoupling portion and reflect them back into said light guide.

20. A light guide comprising an external surface forming a guiding diopter, said light guide being suitable for guiding light rays by reflection on said guiding diopter;
wherein said light guide comprises at least one decoupling portion, with a refraction decoupling diopter arranged so as to refract light rays to decouple them from said light guide, and thus transmit them out of said light guide through said refraction decoupling diopter, said light guide having a rear face having a series of reflecting facets;
wherein said at least one decoupling portion is arranged in substantial proximity to an end of said light guide so that said at least a portion of said light rays originating from said end of said light guide are not reflected by said guiding diopter;
said at least one decoupling portion comprising an external surface arranged such that an angle of incidence of said at least a portion of said light rays with said external surface is less than a limiting angle between a refraction and a total reflection so that said at least a portion of said light rays passing through said at least one decoupling portion will be refracted by said at least one decoupling portion out of and away from said light guide; and
wherein at least one shield is generally opposed to said series of reflecting facets on said rear face and an additional shield opposed to said decoupling portion so as to collect said portion of said light rays leaving said at least one decoupling portion and reflect them back into said light guide.

21. A lighting and/or signaling device for a vehicle comprising a light guide intended to be fed with light rays by a light source and having an optical axis corresponding to a main direction of lighting and/or of signaling;
wherein said light guide comprises an external surface forming a guiding diopter, said light guide being suitable for guiding light rays by reflection on said guiding diopter;
wherein said light guide comprises at least one decoupling portion, with a refraction decoupling diopter arranged so as to refract light rays to decouple them from said light guide, and thus transmit them out of said light guide through said refraction decoupling diopter;
wherein said at least one decoupling portion is in substantial proximity to an end of said light guide so that said at least a portion of said light rays originating from said end of said light guide are not reflected by said guiding diopter;
said at least one decoupling portion comprising an external surface arranged such that an angle of incidence of said at least a portion of said light rays with said external surface is less than a limiting angle between a refraction and a total reflection so that said at least a portion of said light rays passing through said at least one decoupling portion will be refracted by said at least one decoupling portion out of and away from said light guide; and said lighting and/or signaling device comprises at least one shield arranged so as to collect said light rays leaving said at least one decoupling portion;

wherein said at least one shield is arranged facing said decoupling portion so as to collect said portion of said light rays leaving said at least one decoupling portion and reflect them back into said light guide;

wherein said light guide comprises a section of variable cross-section, preferentially forming a clearance or an unevenness, said at least one decoupling portion being arranged on said section of variable cross-section;

wherein said section of variable cross-section is adjacent to one end of said light guide, preferentially to an end comprising an input face admitting light into said light guide.

* * * * *